US012050482B2

(12) United States Patent
Ninomiya

(10) Patent No.: US 12,050,482 B2
(45) Date of Patent: Jul. 30, 2024

(54) MULTIDIRECTIONAL INPUT APPARATUS

(71) Applicant: ALPS ALPINE CO., LTD., Tokyo (JP)

(72) Inventor: Nobuyuki Ninomiya, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 113 days.

(21) Appl. No.: 17/810,700

(22) Filed: Jul. 5, 2022

(65) Prior Publication Data

US 2022/0334608 A1 Oct. 20, 2022

Related U.S. Application Data

(63) Continuation of application No. PCT/JP2020/043048, filed on Nov. 18, 2020.

(30) Foreign Application Priority Data

Jan. 10, 2020 (JP) ................................ 2020-002742

(51) Int. Cl.
*H01H 25/04* (2006.01)
*G05G 9/047* (2006.01)

(52) U.S. Cl.
CPC .................. *G05G 9/04796* (2013.01); *G05G 2009/04777* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 25/04
See application file for complete search history.

(56) References Cited

U.S. PATENT DOCUMENTS

2004/0217938 A1 11/2004 Abe et al.
2016/0313759 A1* 10/2016 Okamura .............. H01H 25/04

FOREIGN PATENT DOCUMENTS

| | | |
|---|---|---|
| JP | 2000-357433 | 12/2000 |
| JP | 2002-285580 | 10/2002 |
| JP | 2006-140048 | 6/2006 |
| JP | 2006-331917 | 12/2006 |

OTHER PUBLICATIONS

International Search Report for PCT/JP2020/043048 mailed on Jan. 19, 2021.

* cited by examiner

*Primary Examiner* — Ahmed M Saeed
(74) *Attorney, Agent, or Firm* — IPUSA, PLLC

(57) ABSTRACT

A multidirectional input apparatus includes a housing including an opening portion; an operation member including an operation portion provided outside the housing and configured to be operated, and a shaft portion extending from the operation portion and inserted into the opening portion, the operation member being configured to receive an operation to be tilted with respect to the housing and an operation to be pushed into the housing; and a cover member that covers a portion surrounding the shaft portion, the cover member being configured to come into contact with the housing when the operation of pushing the operation member is performed.

7 Claims, 9 Drawing Sheets

100

100M

MULTIDIRECTIONAL INPUT APPARATUS

CROSS-REFERENCE TO RELATED APPLICATION

The present application is a continuation application of International Application No. PCT/JP2020/043048 filed on Nov. 18, 2020, which is based on and claims priority to Japanese Patent Application No. 2020-002742 filed on Jan. 10, 2020. The contents of these applications are incorporated herein by reference in their entirety.

BACKGROUND OF THE INVENTION

1. Field of the Invention

The present invention relates to a multidirectional input apparatus.

2. Description of the Related Art

Conventionally, there is an operation lever structure of a construction machine including a lever member, a spool pusher flange provided at a lower end of the lever member, and a pilot valve in which a plurality of spools, which are pushed according to the inclination of the spool pusher flange, are provided on an upper surface of a spool flange. This operation lever structure of a construction machine is characterized in that the outer diameter of the spool pusher flange is formed to be larger than the outer diameter of the upper surface of the spool flange of the pilot valve (see, for example, Japanese Patent Document 1).

[Patent Document 1] Japanese Unexamined Patent Application Publication No. 2002-285580

SUMMARY OF THE INVENTION

According to one aspect of the present invention, there is provided a multidirectional input apparatus including a housing including an opening portion; an operation member including an operation portion provided outside the housing and configured to be operated, and a shaft portion extending from the operation portion and inserted into the opening portion, the operation member being configured to receive an operation to be tilted with respect to the housing and an operation to be pushed into the housing; and a cover member that covers a portion surrounding the shaft portion, the cover member being configured to come into contact with the housing when the operation of pushing the operation member is performed.

DETAILED DESCRIPTION OF THE PREFERRED EMBODIMENTS

In the conventional operation lever structure, it is not possible to perform an operation of pushing the lever member in the axial direction. When such an operation is possible, in order to prevent damage to the components or the like that are present in the pushing direction, it is preferable to restrict the operation amount of the operation of pushing the lever member.

Therefore, an object of the present invention is to provide a multidirectional input apparatus that can prevent damage to a component due to a pushing operation.

Hereinafter, an embodiment in which a multidirectional input apparatus of the present invention is applied will be described.

Embodiment

Figure 1:
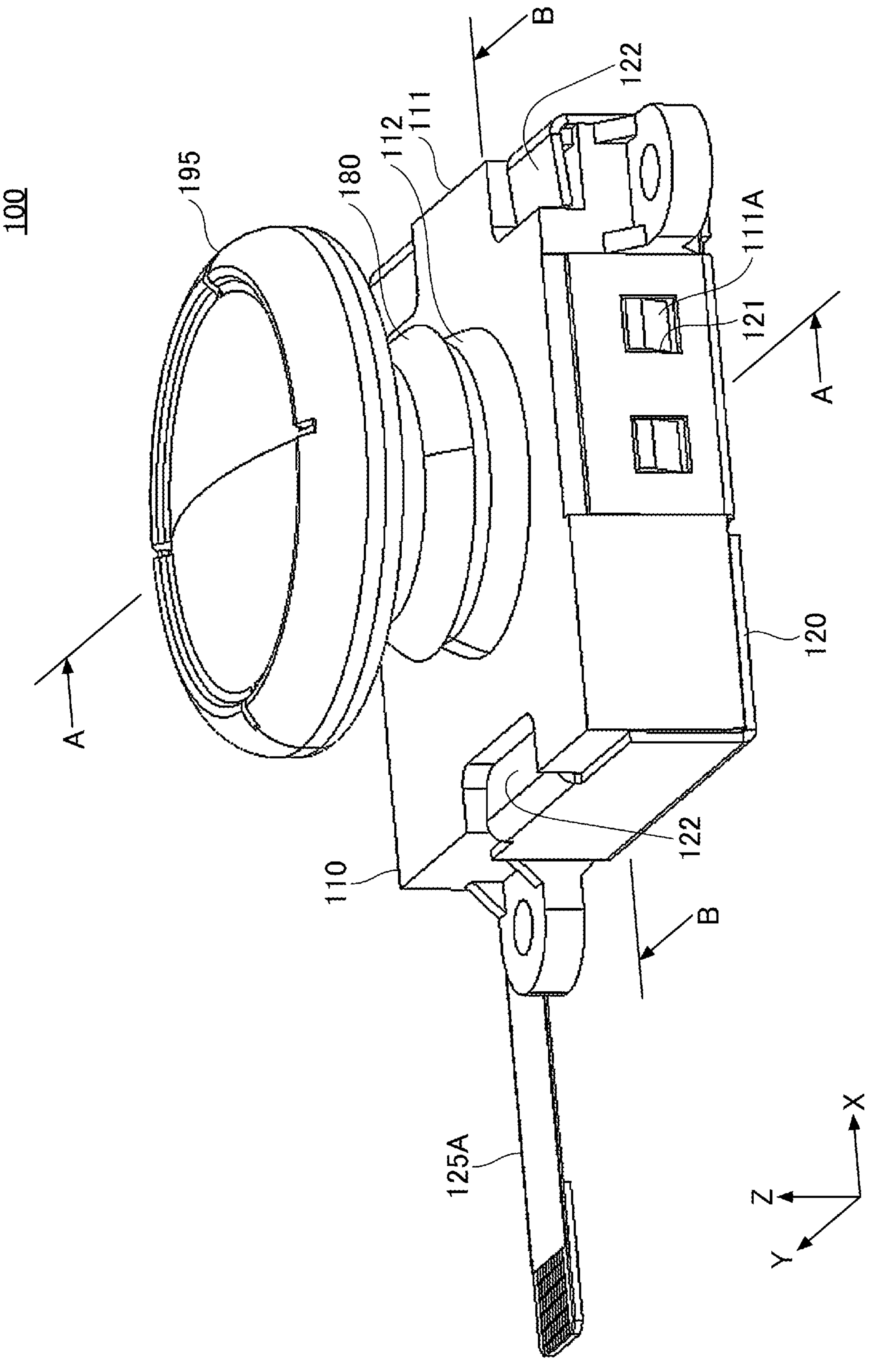
FIG. 1 is an example of a diagram illustrating a multidirectional input apparatus according to an embodiment of the present invention.
Figure 2:
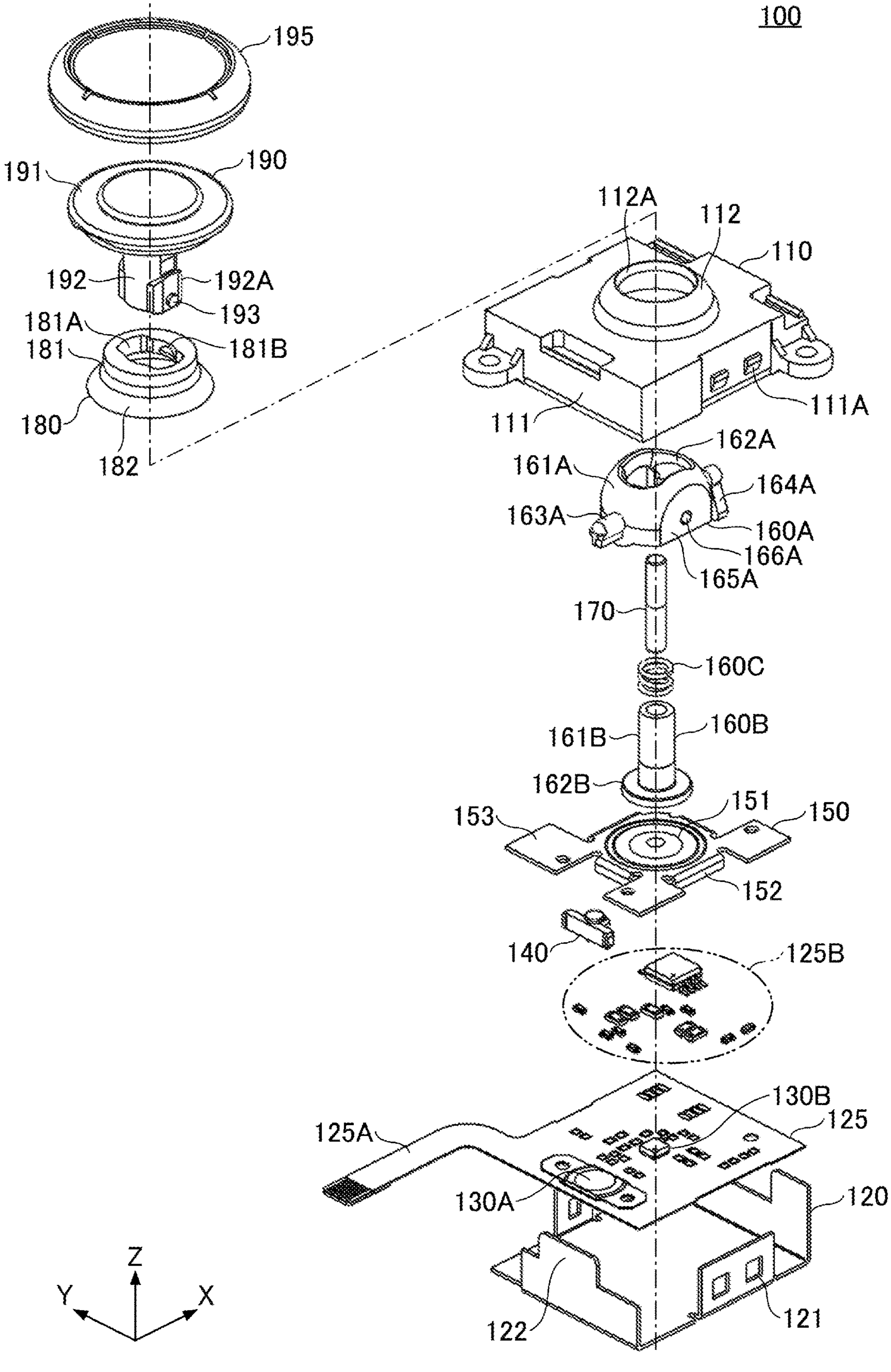
FIG. 2 is a diagram illustrating an example of a state in which the multidirectional input apparatus is disassembled according to an embodiment of the present invention.
Figure 3:
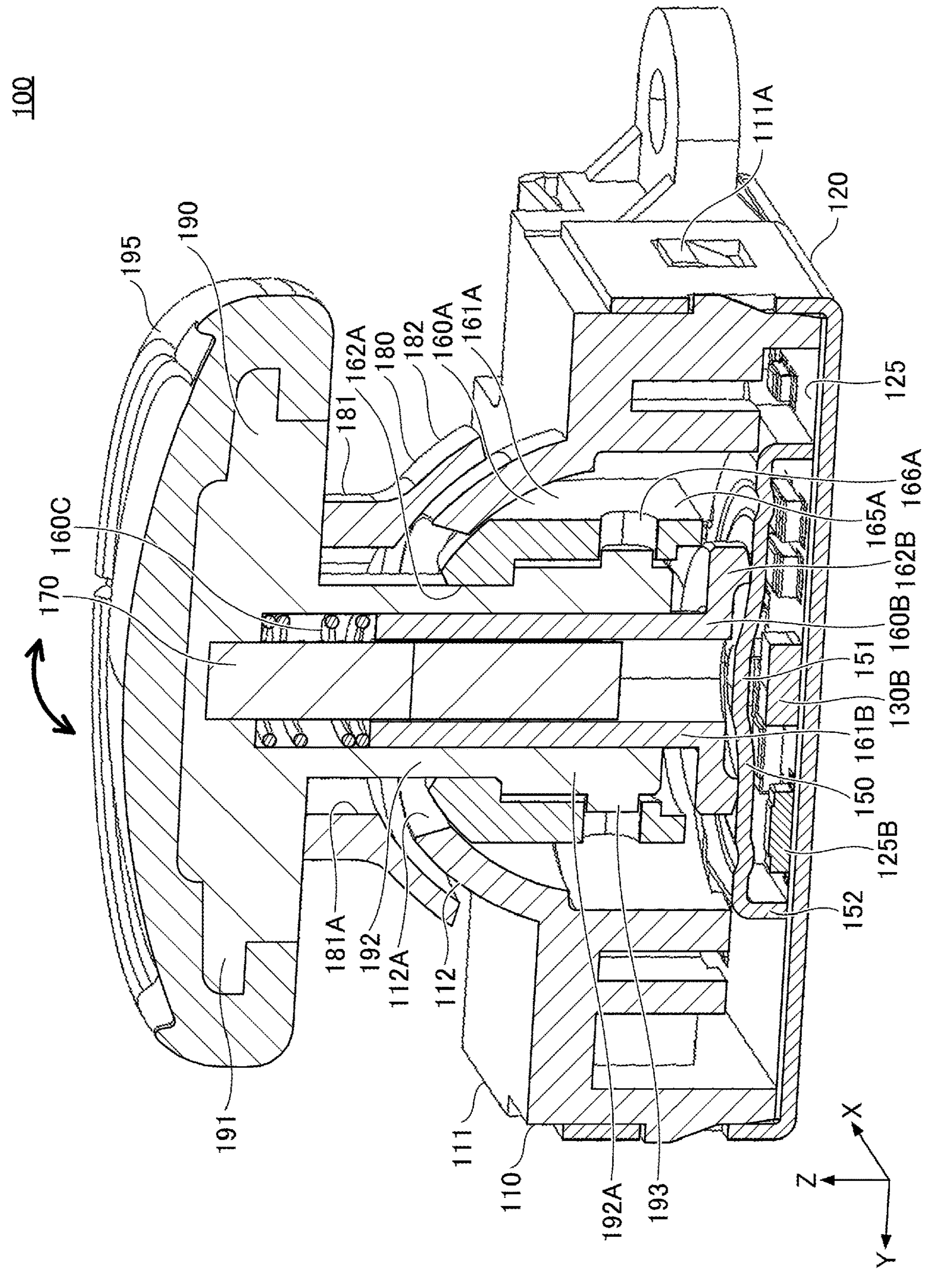
FIG. 3 is a diagram illustrating an example of an A-A arrow cross-section according to an embodiment of the present invention.
Figure 4:
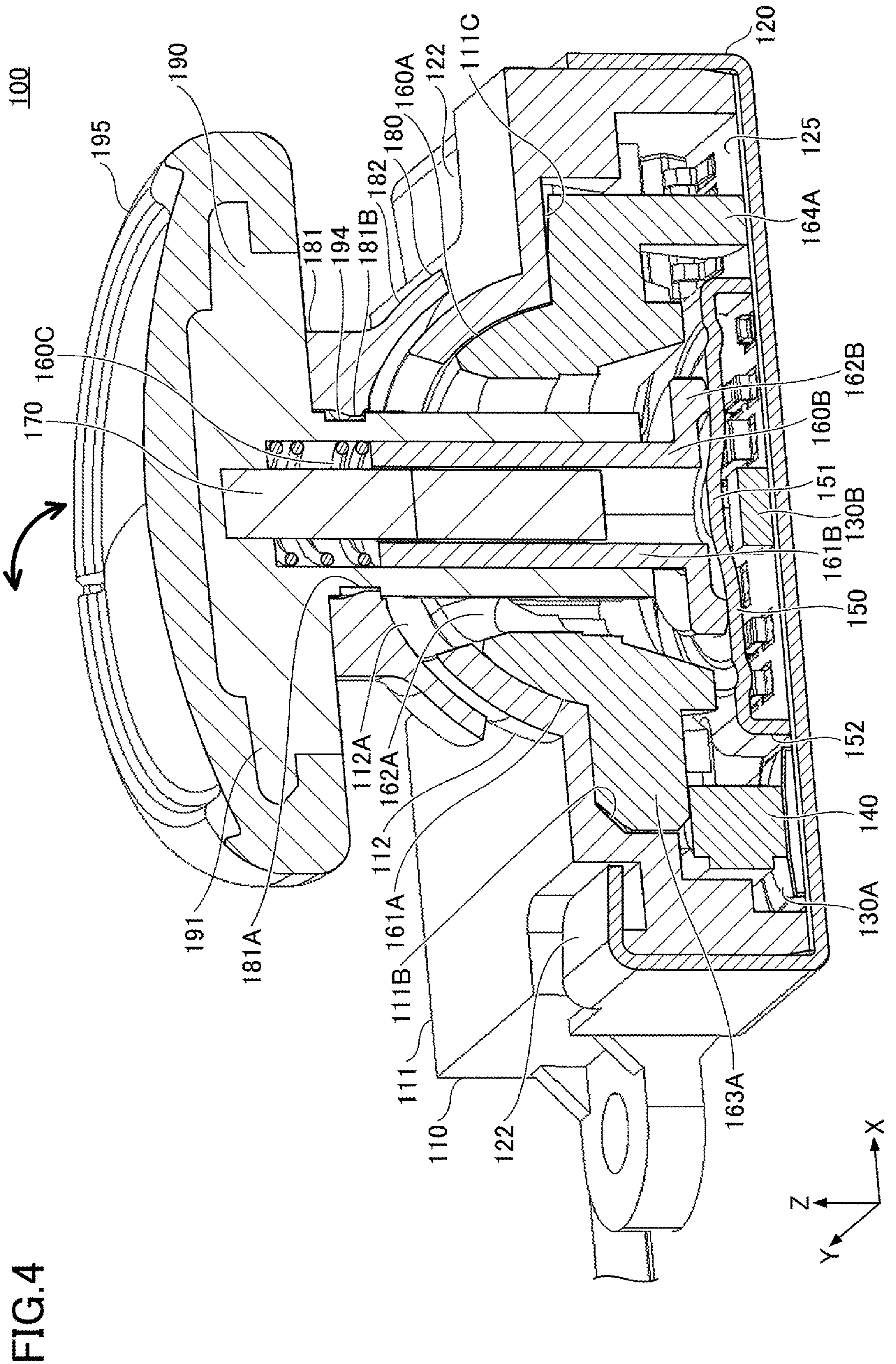
FIG. 4 is a diagram illustrating an example of a B-B arrow cross-section according to an embodiment of the present invention.

FIG. 1 is an example of a diagram illustrating a multidirectional input apparatus 100 according to an embodiment. FIG. 2 is a diagram illustrating an example of a state in which the multidirectional input apparatus 100 is disassembled. FIG. 3 is a diagram illustrating an example of a cross sectional view cut along an A-A arrow of FIG. 1. FIG. 4 is a diagram illustrating an example of a cross sectional view cut along a B-B arrow of FIG. 1.

The following description will be given upon defining an XYZ coordinate system. Hereinafter, for the sake of explanation, a planar view refers to an XY plane view, and the negative side of the Z axis is referred to as the lower side or lower, and the positive side of the Z axis is referred to as the upper side or the upper, but these do not represent a universal vertical relationship.

The multidirectional input apparatus 100 includes a housing 110, a frame 120, a flexible printed circuit (FPC) 125, a metal contact 130A, a magnetic sensor 130B, a stem 140, a plate 150, actuators 160A and 160B, a spring 160C, a magnet 170, a cover 180, a lever 190, and a cap 195.

The multidirectional input apparatus 100 is an input apparatus in which an operation of tilting the lever 190 and an operation of pushing the lever 190 downward are possible. Such a multidirectional input apparatus 100 may be used, for example, as an operation unit of a game machine.

The housing 110 is made, for example, of resin and has a body 111 and a dome portion 112. The body 111 is a member that is generally rectangular in shape and does not have a bottom. The body 111 becomes a member with a bottom when the frame 120 is attached thereto from the bottom. The housing 110 and frame 120 represent an example of a housing, and the body 111 and the frame 120 represent an example of a housing body.

The dome portion 112 is a dome-like portion protruding upwardly from the center of the upper surface of the body 111 and has an opening portion 112A on the top thereof. The upper surface of the dome portion 112 has a spherical shape.

The frame 120 is, for example, made of metal and has an opening portion 121 into which an engagement portion 111A protruding from the side of the body 111 of the housing 110 is fit, and the frame 120 also has an engagement portion 122 that is bent and that engages with the body 111 in a state where the frame 120 is mounted to the body 111 as illustrated in FIG. 1.

The FPC 125 is disposed on the upper surface of the portion parallel to the XY plane at the center of the frame 120. The FPC 125, the metal contact 130A, the magnetic sensor 130B, the stem 140, the plate 150, the actuator 160A, a part of the actuator 160B, and a part of the magnet 170 are housed within the space closed by the frame 120 and the housing 110.

As long as the frame 120 is a member that can be mounted to the body 111 of the housing 110 from the lower side to form a housing space as described above, the structure of mounting the frame 120 to the housing 110 may be any kind of structure.

The FPC 125 is, for example, a member having a wiring pattern on a surface such as polyimide and has a wiring portion 125A. The FPC 125 is equipped with electronic components 125B, the metal contact 130A, and the magnetic sensor 130B.

The metal contact 130A is mounted on the −X direction side on the upper surface of the FPC 125. The metal contact 130A has a metal dome capable of a reversing motion, and the dome has a shape that protrudes upward, and when pushed downward by the stem 140, the dome is caused to protrude downward by the reversing motion, and, therefore, a pushing operation in the Z direction is detected.

The magnetic sensor 130B is mounted substantially in the center of the upper surface of the FPC 125. The magnetic sensor 130B is equipped with a sensor for detecting a change in the magnetic field in the X direction and a sensor for detecting a change in the magnetic field in the Y direction, and the magnetic sensor 130B detects the displacement of the magnet 170 in the X direction and the Y direction.

The stem 140 is, for example, a resin member and is provided to push the metal contact 130A downward.

The plate 150 is, for example, made of metal and has a base portion 151, a leg portion 152, and an extension portion 153. The base portion 151 is located at the center of the plate 150 and the actuator 160B is mounted thereon. The leg portion 152, which is extending downward, is provided on four sides of the base portion 151. As the lower end of the leg portion 152 comes into contact with the upper surface of the FPC 125, the base portion 151 is positioned higher than the FPC 125 by the height of the leg portion 152. The magnetic sensor 130B and some of the electronic components 125B are disposed under the base portion 151, and even when the actuator 160B is pushed in the downward direction, the magnetic sensor 130B or the like can be protected. The plate 150 is fixed to the housing 110 by the extension portion 153 extending outwardly from the base portion 151 in planar view.

The actuator 160A, for example, is made of resin and is an example of a movable portion. The actuator 160A includes a base portion 161A, an opening portion 162A, shaft portions 163A, 164A, a side portion 165A, and a through-hole 166A.

The actuator 160A holds the lever 190 so as to be tiltable in the X axis direction and is tiltable in the Y axis direction relative to the housing 110. The X axis is an example of the first axis and the Y axis is an example of the second axis. Tiltable in the X axis direction means that the lever 190 can tilt in the X direction by using the Y axis as the rotation axis as illustrated in FIG. 3. Tiltable in the Y direction means that the actuator 160A can tilt in the Y direction by using the X axis as the rotation axis as illustrated in FIG. 4.

The base portion 161A is the body of the actuator 160A and has a dome-like shape. The dome shape of the base portion 161A corresponds to the spherical surface of the lower surface of the dome portion 112 of the housing 110. The opening portion 162A is provided at the top of the base portion 161A. The opening portion 162A has a length in the X direction illustrated in FIG. 4 that is longer than the length in the Y direction illustrated in FIG. 3.

The shaft portion 163A is provided on the −X direction side of the base portion 161A, and the shaft portion 164A is provided on the +X direction side of the base portion 161A. The side surface of the base portion 161A on the ±Y direction side is a side surface parallel to the XZ plane and is shaped as if the dome shape is cut off. The side portion 165A is provided with the through-hole 166A.

The shaft portions 163A and 164A are provided to allow the actuator 160A to tilt in the Y direction relative to the housing 110. The upper surfaces of the shaft portions 163A and 164A are curved like the side surfaces of a cylinder having the X axis as the center axis.

The shaft portion 163A is fitted into a recess portion 111B inside the body 111 of the housing 110 as illustrated in FIG. 4. The width in the Y axis direction of the recess portion 111B is matched to the width in the Y axis direction of the shaft portion 163A. The shaft portion 163A is held by the recess portion 111B in a rotatable manner in the YZ plane with the X axis as the rotation axis.

The shaft portion 164A is fitted into a recess portion 111C inside the body 111 of the housing 110 as illustrated in FIG. 4. As illustrated 3C in FIG. 4, the shaft portion 164A is longer in the Z direction than the shaft portion 163A.

The upper surface of the shaft portion 164A is curved like the sides of a cylinder having the X axis as the center axis. The width in the Y axis direction of the recess portion 111C is matched to the width in the Y axis direction of the shaft portion 164A. The shaft portion 164A is held by the recess portion 111C in a rotatable manner in the YZ plane with the X axis as the rotation axis.

In the through-hole 166A, a shaft portion 193 of the lever 190 is inserted so that the lever 190 is tiltable in the X direction with the Y axis as a rotation axis.

Also, when the lever 190 is pushed downward (pressed), the actuator 160A moves such that the shaft portion 163A shifts diagonally downward in FIG. 4 to push the stem 140 downward. As a result, the metal contact 130A performs the reversing motion.

The actuator 160B is a member that supports the lever 190 with respect to the bottom portion of the housing 110. The actuator 160B has a cylindrical portion 161B and a stand portion 162B. The cylindrical portion 161B has a through-hole therein through which the magnet 170 can be inserted and fixed inside the lever 190. The stand portion 162B is provided below the cylindrical portion 161B.

The stand portion 162B is a disk-like portion having a larger diameter than the cylindrical portion 161B and has a through-hole at the center communicating with the through-hole of the cylindrical portion 161B. The stand portion 162B is positioned above the plate 150 and comes into contact with the upper surface of the plate 150.

The spring 160C is provided between the lever 190 and the actuator 160B with the magnet 170 inserted therein. Specifically, the spring 160C is disposed within the lever 190 on the upper side of the actuator 160B. The spring 160C preloads the lever 190 upward with respect to the actuator 160B.

The magnet 170 is a rod-shaped permanent magnet, for example, with the upper half being the S pole and the lower half being the N pole. The magnet 170 is fixed with the top end being inserted into an operation portion 191 of the lever 190, and the bottom half being inserted into the through-hole of the actuator 160B. The section of the magnet 170 between the top end which is inserted into the lever 190 and the portion which is inserted into the through-hole of the actuator 160B, is inserted through the spring 160C.

The cover 180 is an example of a cover member and is configured to have a higher strength than the lever 190. The cover 180 has a base portion 181 and a dome portion 182. The base portion 181 is a cylindrical portion having a through-hole 181A which passes in the Z direction. The through-hole 181A has a short shape in the X axis direction and a long shape in the Y direction, as illustrated in FIG. 2.

The through-hole 181A is penetrated by a shaft portion 192 of the lever 190. The dome portion 182 is provided below the base portion 181. The base portion 181 is provided continuously on top of the dome portion 182.

The base portion 181 has a protruding portion 181B fitted into a recess portion 194 (see FIG. 4) provided on the upper side of the shaft portion 192 of the lever 190 in a ±X direction. The protruding portion 181B protrudes inwardly on the X direction side of the through-hole 181A. Because of the protruding portion 181B, the through-hole 181A is short in the X axis direction and has a long shape in the Y direction.

The cover 180 is mounted below the operation portion 191 of the lever 190 by fitting the protruding portion 181B of the base portion 181 into the recess portion 194 of the shaft portion 192 of the lever 190.

The dome portion 182 is an example of a contact portion. The upper surface (curved surface on the +Z direction side) and the bottom surface (curved surface on the −Z direction side) of the dome portion 182 have a spherical shape. The dome portion 182 and the dome portion 112 of the housing 110 have a shape corresponding to a part of two concentric spheres. The two concentric spheres are two spheres whose centers are the same. The dome portion 182 and the dome portion 112 of the housing 110 have a shape corresponding to a portion of such two hollow spheres.

As illustrated in FIGS. 3 and 4, when the lever 190 is in a neutral position, there is a gap between the dome portion 182 and the dome portion 112 of the housing 110. A neutral position is a position in which the lever 190 is not tilted in either the direction X or the direction Y and the lever 190 is not pushed downward.

When the lever 190 is pushed downward, the lower surface of the dome portion 182 of the cover 180 comes into contact with the upper surface of the dome portion 112 of the housing 110. The cover 180 is mounted on the lower surface of the operation portion 191 of the lever 190, and, therefore, when the lever 190 is pushed downward, the cover 180 is sandwiched between the lower surface of the operation portion 191 and the upper surface of the dome portion 112 of the housing 110. At this time, the lever 190 pushes the actuator 160A downward, the stem 140 pushes the metal contact 130A, and the metal contact 130A is reversed. At this time, the spring 160C contracts and the actuator 160B is held in contact with the upper surface of the plate 150.

The lower surface of the dome portion 182 of the cover 180 comes into contact with the upper surface of the dome portion 112 of the housing 110 and the cover 180 is sandwiched between the lower surface of the operation portion 191 and the upper surface of the dome portion 112 of the housing 110 so that the lever 190 cannot be pushed downward more than the reversing of the metal contact 130A. Therefore, damage to the magnetic sensor 130B, the electronic components 125B, or the like can be prevented.

The cover 180 also has a higher strength than the lever 190, so that the thickness of the dome portion 182 can be reduced. This cover 180 may be made, for example, of synthetic resin of high hardness.

The diameter of the operation portion 191 is larger than the diameter of the shaft portion 192, and, therefore, the lever 190 and the cover 180 cannot be formed integrally in a molding process, and are thus formed separately. When the lever 190 and the cover 180 are separate bodies, the lever 190 and the cover 180 can be made of different materials, and, therefore, the cover 180 can be made of a material that has a higher strength than that of the lever 190, so that the cover 180 can be made thinner without reducing the strength of the cover 180, as compared to the case where the lever 190 and the cover 180 are formed integrally.

The lever 190 is an example of an operation member including the operation portion 191 and the shaft portion 192. The operation portion 191 is a disc-like member having a diameter greater than that of the shaft portion 192. A cap 195 is attached to the upper surface of the operation portion 191.

The shaft portion 192 is a cylindrical portion extending downward from the center of the lower surface of the operation portion 191. The shaft portion 192 includes a protruding portion 192A protruding from both sides of the lower side in the Y direction as illustrated in FIG. 3. The protruding portion 192A is provided with a shaft portion 193 cylindrically protruding in the Y direction. Further, as illustrated in FIG. 4, the recess portion 194 is provided on both sides of the upper side of the shaft portion 192 in the X direction.

As illustrated in FIG. 2, the shaft portion 192 is inserted into the through-hole 181A from the upper side with the protruding portion 192A positioned on the Y direction side of the through-hole 181A of the cover 180. Accordingly, the protruding portion 181B fits into the recess portion 194 and the cover 180 and the lever 190 are fixed.

The shaft portion 193 is inserted into the through-hole 166A of the actuator 160A and is rotatably held by the through-hole 166A with the Y axis as a rotation axis. Thus, the lever 190 is mounted to the actuator 160A and can be tilted in the X direction (the direction of the arrow illustrated in FIG. 3) with respect to the actuator 160A.

Further, the magnet 170 is mounted to the lever 190, and, therefore, when the lever 190 is tilted in the X direction and the Y direction without being pushed down, the distance between the magnetic sensor 130B and the magnet 170 does not change, so that the magnetic sensor 130B can accurately detect the direction in which the magnet 170 is tilted. The direction in which the magnet 170 is tilted is equal to the direction in which the shaft portion 192 of the lever 190 is tilted.

The reason why the magnetic sensor 130B accurately detects the direction in which the magnet 170 is tilted is as follows. When the lever 190 is in a neutral state, the magnetic field of the magnet 170 is directed in the Z axis direction, and there is no magnetic field between the X axis component and the Y axis component. When the lever 190 is tilted, the magnetic field of the X axis component or the Y axis component increases in accordance with the tilt angle, so that the magnetic sensor 130B can accurately detect the tilt angle.

For example, if the distance between the magnet 170 and the magnetic sensor 130B changes when the lever 190 is tilted, the magnetic field intensity of the X axis component or the Y axis component changes due to the change in both the tilt angle and the distance, and, therefore, the tilt angle cannot be accurately detected.

For this reason, in the embodiment, the magnet 170 is attached to the lever 190.

The opening portion 162A has a shorter length in the Y direction illustrated in FIG. 3 than the length in the X direction illustrated in FIG. 4, and the protruding portion 192A of the shaft portion 192 protrudes in the Y direction side, and, therefore, the shaft portion 192 will not come off upward from the actuator 160A.

The cap 195 is, for example, a disc-like member made of resin. The cap 195 is mounted on the operation portion 191 of the lever 190.

Figure 5:
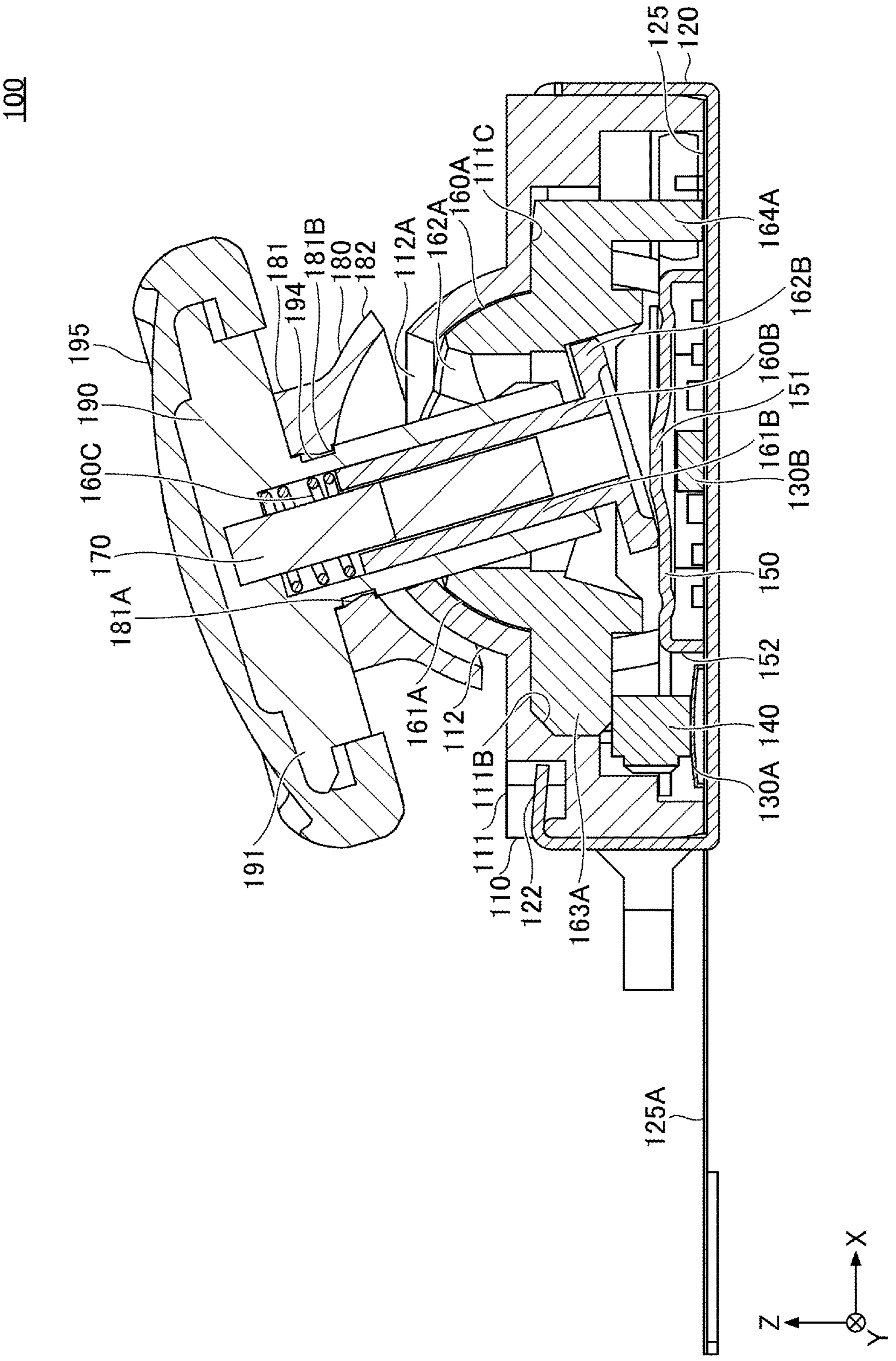
FIG. 5 is a diagram illustrating an operation of the multidirectional input apparatus according to an embodiment of the present invention.
Figure 6:
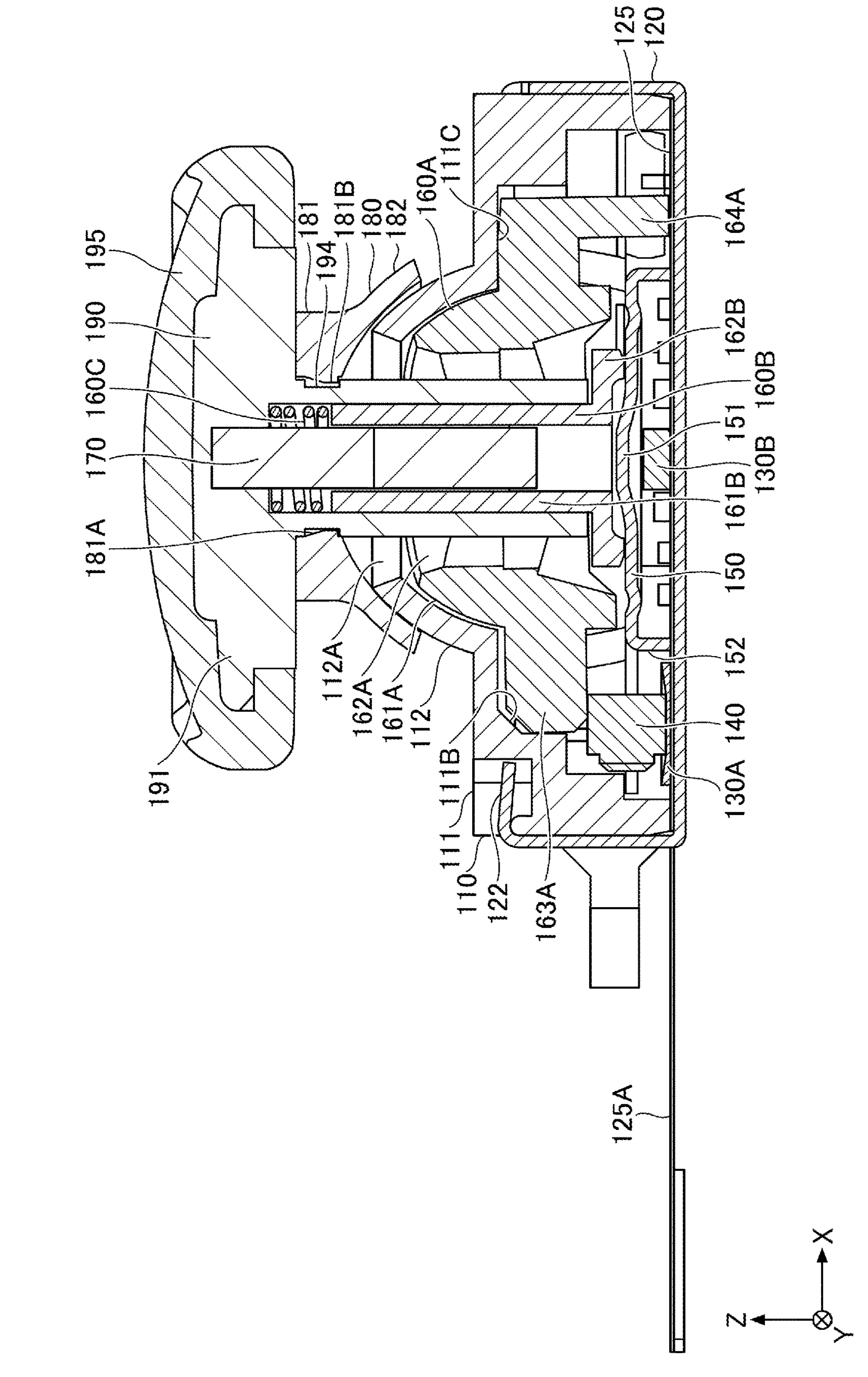
FIG. 6 is a diagram illustrating an operation of the multidirectional input apparatus according to an embodiment of the present invention.
Figure 7:
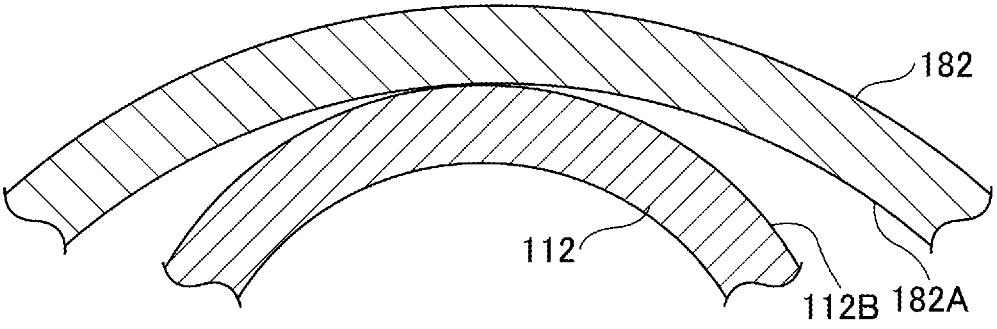
FIG. 7 is a diagram illustrating an operation of the multidirectional input apparatus according to an embodiment of the present invention.

Next, an operation when the multidirectional input apparatus 100 is operated will be described with reference to FIGS. 5 to 7. FIGS. 5 to 7 are diagrams illustrating an operation of the multidirectional input apparatus 100. FIG. 5 illustrates a state in which the lever 190 is tilted in the −X direction without being pushed down, by a XZ cross-sectional diagram.

When the lever 190 is tilted in the −X direction, the movement of the lever 190 is restricted by the shaft portion 192 contacting the opening portion 112A of the dome portion 112 of the housing 110. This is also the same when the lever 190 is tilted in the +X direction.

As can be seen in FIG. 3, when the lever 190 is tilted in the ±Y direction, the movement of the lever 190 is restricted by the shaft portion 192 contacting the opening portion 112A of the dome portion 112 of the housing 110.

FIG. 6 illustrates a state in which the lever 190 is pushed downward. FIG. 6 illustrates the XZ cross-section. As an example, when the lever 190 is pushed by a certain amount downward from the neutral position, the spring 160C is compressed to move the lever 190 downward while the actuator 160A moves diagonally downward at the XZ cross section to push the stem 140 downward. As a result, the metal contact 130A performs the reversing motion.

Further, when the lever 190 is pushed in by a certain amount as described above, the lower surface of the dome portion 182 of the cover 180 comes into contact with the upper surface of the dome portion 112 of the housing 110, so that the lever 190 cannot be pushed downward more than the certain amount. Therefore, damage to the magnetic sensor 130B, the electronic components 125B, or the like can be prevented.

Note that the operation of pushing the lever 190 downward can be performed in any condition in which the lever 190 is tilted in one of the two axial directions. Even if the lever 190 is tilted, similar to when the lever 190 is in a neutral position, when the lever 190 is pushed down by a certain amount, the spring 160C is compressed and the lever 190 moves downward while the actuator 160A moves diagonally downward at XZ cross-section to push stem 140 downward. As a result, the metal contact 130A performs the reversing motion.

When the lower surface of the dome portion 182 of the cover 180 comes into contact with the upper surface of the dome portion 112 of the housing 110, a lower surface 182A of the dome portion 182 having a larger radius than the dome portion 112 comes into contact with an upper surface 112B of the dome portion 112 as illustrated in FIG. 7. Such a configuration allows the lower surface of the dome portion 182 to come into contact with the upper surface of the dome portion 112 when the lever 190 is pushed downward from a neutral position or is pushed downward from a position tilted in either one of the two axial directions.

Therefore, when the lever 190 is pushed in the downward direction, it is possible to make the operation amount of the lever 190 to be a certain amount and to stably restrict the operation amount. It is also possible to effectively prevent the lever 190 from being pushed in by more than a certain amount.

As described above, when the lever 190 is pushed downward, the lower surface 182A of the dome portion 182 of the cover 180 comes into contact with the upper surface 112B of the dome portion 112 of the housing 110 so that the lever 190 cannot be pushed downward more than the extent of the reversing motion of the metal contact 130A. Therefore, damage to the magnetic sensor 130B, the electronic components 125B, or the like can be prevented.

Accordingly, the multidirectional input apparatus 100 which can prevent the damage of components due to pushing operations, can be provided.

Note that the above describes that the magnet 170 is mounted to the lever 190 and the magnetic sensor 130B detects tilting of the lever 190; however, it is possible to use a resistive sensor that detects the tilt by using the change in the resistance value caused by a change in the position where the lower end or the like of the lever 190 contacts the resistor on the FPC 125 when the lever 190 is tilted.

Figure 8:
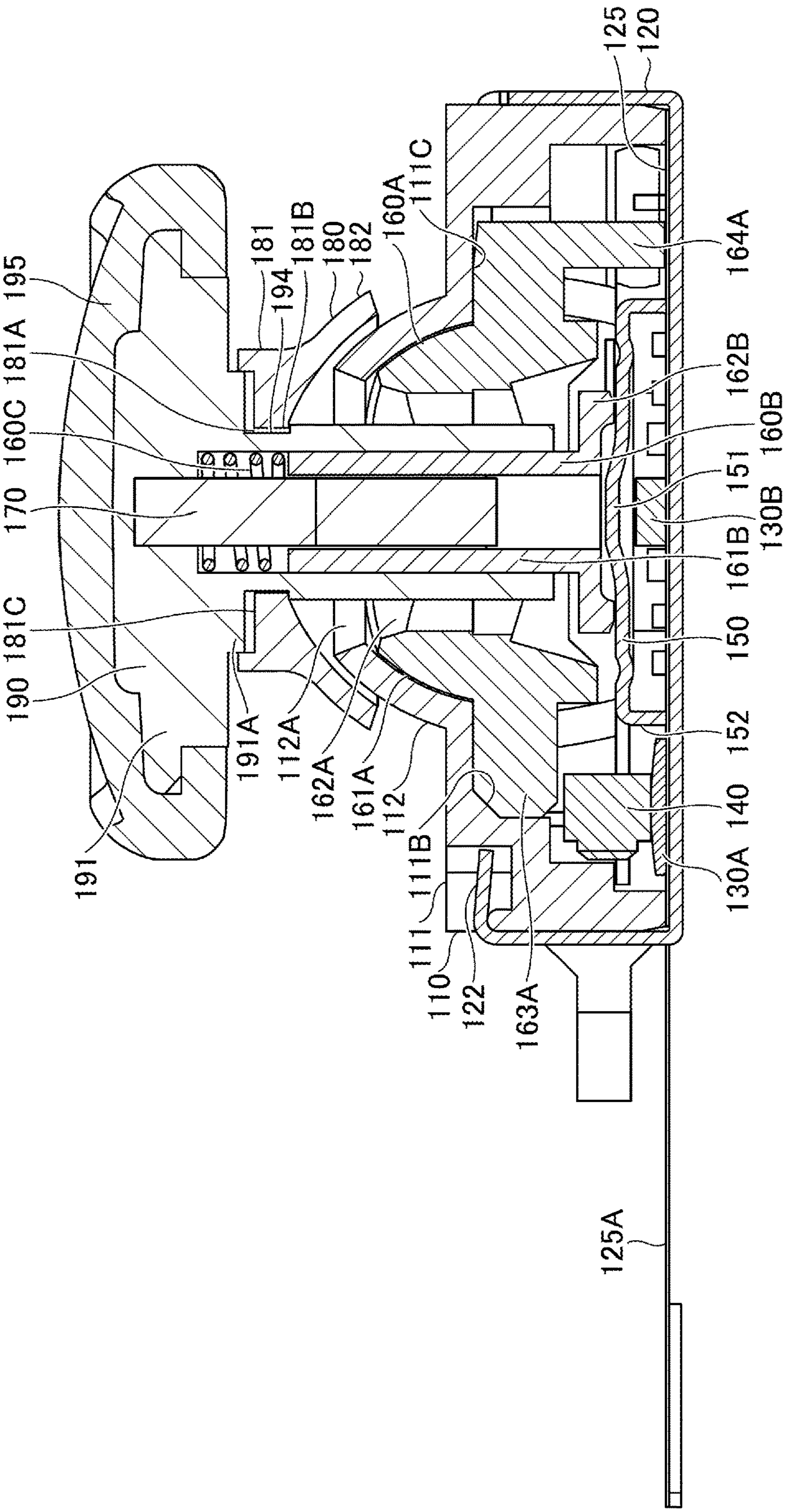
FIG. 8 is a diagram illustrating a multidirectional input apparatus according to a modified example of an embodiment of the present invention.
Figure 9:
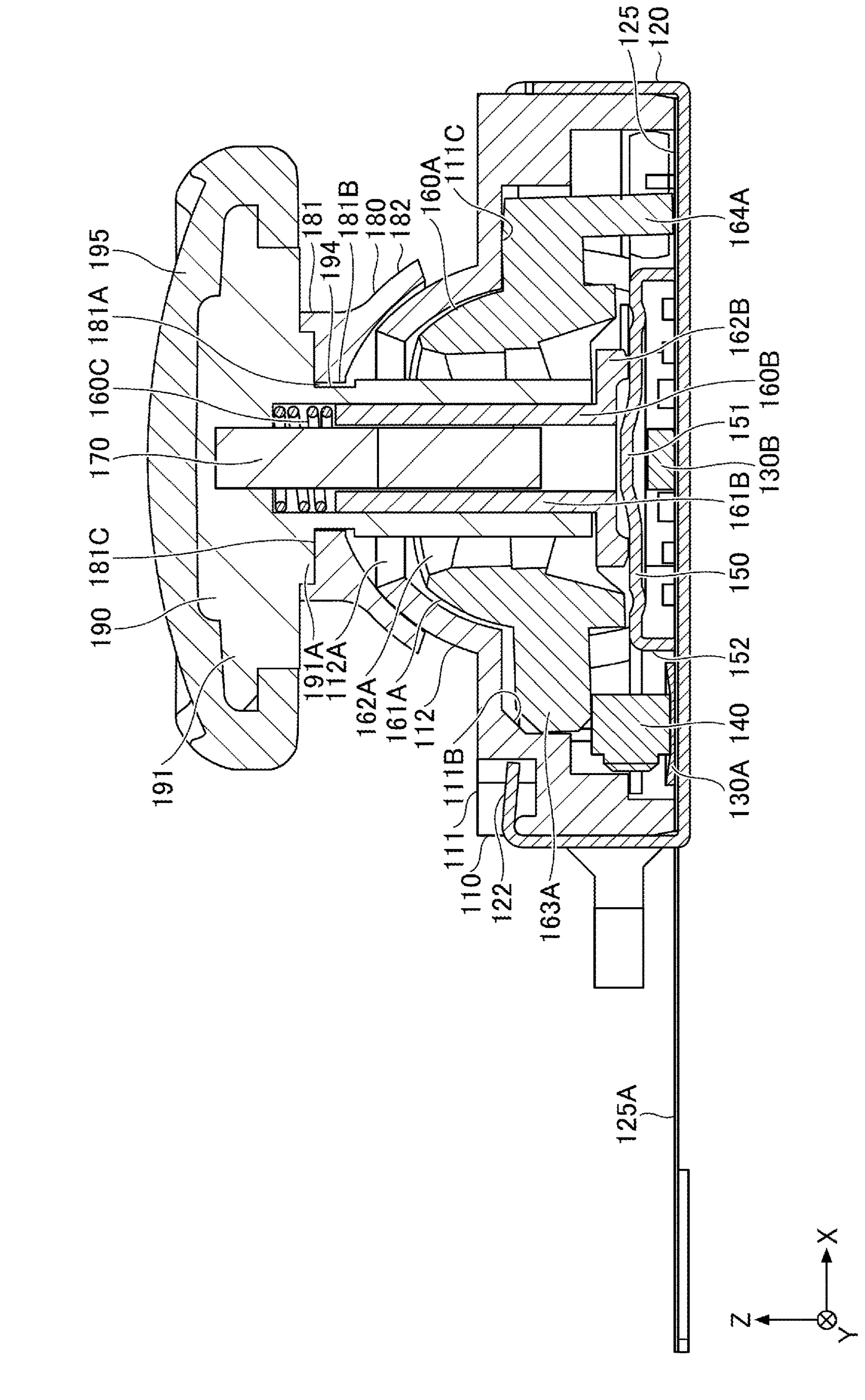
FIG. 9 is a diagram illustrating a multidirectional input apparatus according to a modified example of an embodiment of the present invention.

Alternatively, a multidirectional input apparatus 100M illustrated in FIGS. 8 and 9 may be used instead of the multidirectional input apparatus 100. FIGS. 8 and 9 are diagrams illustrating the multidirectional input apparatus 100M according to a modified example of an embodiment. FIG. 8 illustrates a cross-section of a state in which a pushing operation is not performed, and FIG. 9 illustrates a cross-section in a state in which a pushing operation is performed.

In the multidirectional input apparatus 100M, a protruding portion 191A protruding downward at the center of the lower surface of the operation portion 191 is provided, and the recess portion 194 of the lever 190 is formed longer at the lower part in the Z direction than the recess portion 194 of the lever 190 of the multidirectional input apparatus 100. In the multidirectional input apparatus 100M, the length of the recess portion 194 in the Z direction is longer than the length of the protruding portion 181B in the Z direction and the position of the lower end of the recess portion 194 is low. A recess portion 181C corresponding to the protruding portion 191A is provided at the center of the upper surface of the cover 180.

With such a configuration, in a state in which the pushing operation is not performed, as illustrated in FIG. 8, the lever 190 is preloaded upward by the spring 160C with respect to the actuator 160B, and the protruding portion 181B is positioned at the lower end of the recess portion 194, and there is a gap between the lower surface of the protruding portion 191A and the upper surface of the recess portion 181C.

In the state where the pushing operation is performed, as illustrated in FIG. 9, the spring 160C contracts, and the protruding portion 181B is positioned at the upper end of the recess portion 194. The lower surface of the protruding portion 191A comes into contact with the upper surface of the recess portion 181C, and the lever 190 pushes the cover 180 downward. That is, in this state, the cover 180 is sandwiched between the dome portion 112 of the housing 110 and the lever 190.

Also in the multidirectional input apparatus 100M having such a configuration, when the lever 190 is pushed downward, the lower surface 182A of the dome portion 182 of the cover 180 comes into contact with the upper surface 112B of the dome portion 112 of the housing 110, while the lower surface of the protruding portion 191A comes into contact with the upper surface of the recess portion 181C, so that the lever 190 cannot be pushed downward more than the extent of the reversing motion of the metal contact 130A. Therefore, damage to the magnetic sensor 130B, the electronic components 125B, or the like can be prevented.

Accordingly, the multidirectional input apparatus 100M which can prevent damage to a component due to a pushing operation, can be provided. Note that the shapes of the protruding portion 181B and the recess portion 194 of FIGS. 8 and 9 are not limited thereto. As long as there is a gap between the lower surface of the protruding portion 191A and the upper surface of the recess portion 181C, and the same function can be obtained when this gap is reduced by a pushing operation so that surfaces come into contact with each other, the shapes of the protruding portion 181B and the recess portion 194 may be shaped as illustrated in FIG. 6.

According to an aspect of the present invention, a multidirectional input apparatus capable of preventing a component from being damaged due to a pushing operation, can be provided.

Although the multidirectional input apparatus according to the embodiments of the present invention has been described as above, the present invention is not limited to specifically disclosed embodiments, and various modifications and changes may be made without departing from the scope of the claims.

What is claimed is:

1. A multidirectional input apparatus comprising:
a housing including an opening portion;
an operation member including
an operation portion provided outside the housing and configured to be operated, and
a shaft portion extending from the operation portion and inserted into the opening portion,
the operation member being configured to receive an operation to be tilted with respect to the housing and an operation to be pushed into the housing; and
a cover member that covers a portion surrounding the shaft portion,
wherein the cover member includes:
a base portion configured to be attached to a lower side of the operation portion; and
a contact portion that extends from the base portion in a direction away from the operation portion,
wherein the housing includes:
a housing body; and
a dome portion protruding out from a surface of the housing body, the dome portion having the opening portion at a top of the dome portion, and
wherein the contact portion has a dome-like shape corresponding to the dome portion, and
wherein
a gap is provided between the contact portion and the dome portion when the operation member is not operated,
the contact portion and the dome portion have shapes corresponding to a part of two concentric spheres, and
the contact portion and the dome portion do not contact each other when the operation of pushing the operation member is not performed, and the contact portion and the dome portion contact each other when the operation of pushing the operation member is performed.

2. The multidirectional input apparatus according to claim 1, wherein when the operation of tilting the operation member is performed, the shaft portion comes into contact with a rim of the opening portion.

3. The multidirectional input apparatus according to claim 1, wherein the cover member has a higher strength than the operation member.

4. The multidirectional input apparatus according to claim 1 wherein the cover member is fixed to the operation member.

5. The multidirectional input apparatus according to claim 1, further comprising:
a movable portion configured to hold the shaft portion so as to be tiltable in a first axis direction, and configured to be tiltable in a second axis direction with respect to the housing.

6. The multidirectional input apparatus according to claim 1 wherein the operation portion is larger than the shaft portion in a planar view.

7. A multidirectional input apparatus comprising:
a housing including an opening portion;
an operation member including
an operation portion provided outside the housing and configured to be operated, and
a shaft portion extending from the operation portion and inserted into the opening portion,
the operation member being configured to receive an operation to be tilted with respect to the housing and an operation to be pushed into the housing; and
a cover member that covers a portion surrounding the shaft portion, the cover member being configured to come into contact with the housing when the operation of pushing the operation member is performed,
wherein the multidirectional input apparatus further comprises:
a support portion configured to support the operation member with respect to a bottom portion of the housing; and
a spring provided between the support portion and the operation member, the spring being configured to preload the operation member with respect to the support portion in a direction opposite to a direction of the operation of pushing the operation member, wherein
the cover member is movable in a direction in which the spring extends and contracts along the shaft portion,
a gap is provided between the operation portion and the cover member when the operation of pushing the operation member is not performed, and
the operation portion and the cover member come in contact with each other when the operation of pushing the operation member is performed.

* * * * *